United States Patent [19]

Heindel et al.

[11] Patent Number: 4,717,310

[45] Date of Patent: Jan. 5, 1988

[54] APPARATUS FOR REMOVING MOLDED ARTICLES FROM INJECTION MOLDING MACHINES

[75] Inventors: Friedrich Heindel, Baden, Austria; Wolf D. Hellmann, Beilngries, Fed. Rep. of Germany

[73] Assignee: Battenfeld Kunststoff maschinen Ges. m.b.H.

[21] Appl. No.: 906,320

[22] Filed: Sep. 11, 1986

[30] Foreign Application Priority Data

Sep. 11, 1985 [DE] Fed. Rep. of Germany ....... 3532300

[51] Int. Cl.⁴ ............................................. B25J 3/00
[52] U.S. Cl. ................................. 414/753; 414/589; 901/16
[58] Field of Search ............... 414/589, 749, 751, 753; 425/537, 554, 556; 901/16

[56] References Cited

U.S. PATENT DOCUMENTS

| | | | |
|---|---|---|---|
| 3,654,613 | 4/1972 | Dunne et al. | 414/753 X |
| 3,915,314 | 10/1975 | Anikanov et al. | 414/749 |
| 3,921,820 | 11/1975 | Crockett | 414/753 |
| 4,229,156 | 10/1980 | Panissidi | 901/16 X |
| 4,561,825 | 12/1985 | Sakata | 414/753 |
| 4,600,358 | 7/1976 | Graf | 414/749 |

FOREIGN PATENT DOCUMENTS 0603577 4/1978 U.S.S.R. .................. 901/16

*Primary Examiner*—Charles Hart
*Attorney, Agent, or Firm*—Toren, McGeady & Associates

[57] ABSTRACT

An apparatus for removing injection molded articles from the opened injection mold of an injection molding machine. Two carriages traveling in directions perpendicular to each other are used for moving a grasping member for the molded articles. Pneumatic linear drives are used for moving the carriages. To prevent undesired oscillations of a linear drive, a braking device is used which is disengaged when the linear drive is actuated and is engaged when the liner drive is not actuated.

7 Claims, 2 Drawing Figures

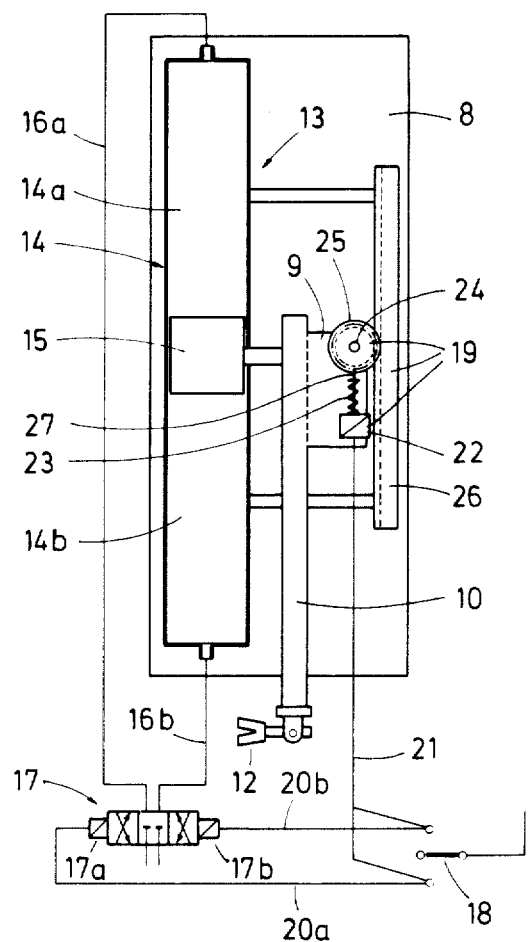

APPARATUS FOR REMOVING MOLDED ARTICLES FROM INJECTION MOLDING MACHINES

BACKGROUND OF THE INVENTION

1. Field of the Invention

The invention relates to an apparatus for removing injection molded articles from the opened injection mold of injection molding machines.

2. Description of the Prior Art

An apparatus of this type includes a grasping member for grasping the injection molded articles. After the mold halves of the injection mold in the closing unit of the injection molding machine have been moved apart, the grasping member is lowered to enable grasping of the molded articles and, after the molded article has been grasped, it is again moved upwardly out of the range of the closing unit. If a high productivity is to be achieved, these movements of the grasping member must be at a high speed. In apparatus of the aforementioned type, the grasping member is attached to a support member which, in turn, is supported by a carriage which moves along a guide member extending in the closing direction of the injection mold. This carriage must also reach high travel speeds, so that the molded articles removed from the injection mold can be dropped off outside of the working range of the injecting molding machine.

In order to obtain high travel speeds of the support member and the carriage carrying the support member, pneumatic linear drives are utilized in the apparatus for removing injection molded articles. The drives include pistons to which compressed air is admitted on two sides.

The pneumatic linear drives of a known type have the disadvantage that when the piston is moved into the desired position, the air present above or below the piston in the working chambers acts as a spring on the piston, so that the piston and the structural part moved by the piston are oscillated in an uncontrolled manner before reaching the desired position of rest.

The oscillation described above of the piston and the structural part connected to the piston is particularly disadvantageous with respect to the grasping member for the molded articles which is moved into the closing units or between the moved-apart mold halves of the injection mold, because the grasping member can only grasp the molded article properly when the grasping member has come completely to rest in the desired position. Thus, the movement of the support member and the grasping member supported by the support member must be adjusted in such a way that the oscillations have ended at the moment the grasping member grasps the molded article in the opened injection mold.

It is, therefore, the primary object of the invention to avoid the aforementioned disadvantages of the known apparatus. Particularly, it is the object of the invention to improve an apparatus of the known type for removing molded articles from the opened injection mold of an injection molding machine, so that an oscillation of the grasping member for the molded article is effectively prevented at least in the removing position of the grasping member in which it is moved into the opened injection mold.

SUMMARY OF THE INVENTION

In accordance with the present invention, the apparatus for removing injection molded articles from the opened injection mold of injection molding machines includes a braking device provided between the vertically movable carriage for the support member and the guide member for the carriage. The braking device is connected to a valve control of the linear drive of the carriage in such a way that the braking device is switched on or operative when the compressed air supply to the piston of the drive is disconnected and the braking device is switched off or inoperative when compressed air is supplied to the piston.

The braking device in accordance with the present invention provides the advantage that it becomes operative immediately upon interruption of the energy supplied to the linear drive, so that the support member is immediately fixed in its position relative to its guide member and, therefore, an oscillation of the gripping member in its position for removing molded articles is prevented.

In accordance with a development of the apparatus for removing molded articles according to the invention, the braking device includes a compression spring, wherein the braking device becomes inoperative by moving a magnetically and/or pneumatically operated slide against the force of the compression spring. Thus, during the operation of the linear drive, the braking device is made ineffective or is disengaged by acting against the spring force acting on the braking device. However, as soon as the linear drive comes to a standstill as a result of an interruption of the energy supply, the action of the spring causes the braking device to be engaged.

The apparatus for removing molded articles according to the invention operates particularly well if a pinion is rotatably mounted on the carriage and/or on the actuating member of the linear drive acting on the carriage, wherein the pinion meshes with a rack permanently fixed to the guide member for the carriage, and wherein the braking device acts on the pinion. The permanent meshed engagement between the rack and pinion ensures an exact adjustment of the grasping member into the position for removing the molded articles when the braking device becomes operative.

In accordance with the present invention, it is also possible to provide spring-biased braking plates on the carriage and/or the actuating member acting on the carriage, wherein a braking rail interacting with the braking plates is arranged on the guide member for the carriage. Such a structurally simple design of the braking device is particularly suitable for use in the horizontal guide member and the carriage movable on the horizontal guide member, if it is desired to position without oscillations the grasping member relative to the closing unit of the injection molding machine and relative to a deposit for the molded articles away from the injection molding machine.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

BRIEF DESCRIPTION OF THE DRAWING

In the drawing:

FIG. 2 is a schematic elevational side view, on a larger scale, of the linear drive for the support member of the apparatus for removing molded articles which carries the grasping member for the molded articles.

DETAILED DESCRIPTION OF THE INVENTION

Figure 1:
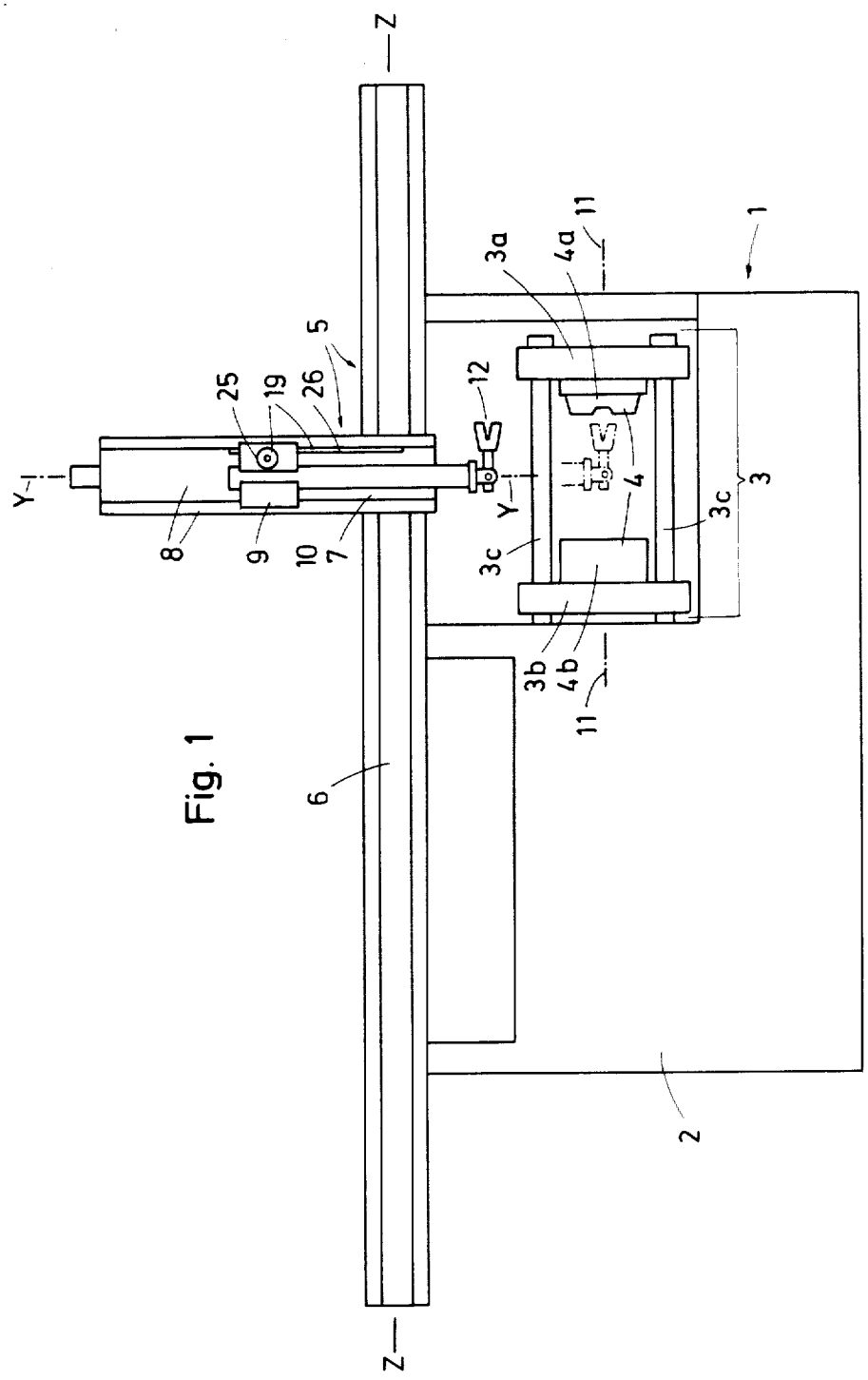
FIG. 1 is a schematic elevational side view of an apparatus for removing molded articles from an injection molding machine.

As illustrated in FIG. 1, an injection molding machine 1 mounted on a base 2 includes a closing unit 3 for an injection mold 4.

The injection mold 4 includes two cooperating mold halves 4a and 4b, wherein mold half 4a is mounted on a stationary support plate 3a, while the other mold half 4b is mounted on a movable support plate 3b of closing unit 3.

Closing unit 3 further includes horizontal guide rods 3c which support the stationary support plate 3a and serve to guide the movable support plate 3b.

Injection molding machine 1 is provided with an apparatus 5 for removing molded articles, so that the molded articles produced in the injection mold 4 can be removed when the mold halves 4a and 4b of the injection mold 4 are moved apart and can be deposited outside of the working range of the injection molding machine 1. Apparatus 5 includes a guide member 6 extending parallel to the closing unit 3 for the injection mold 4 and a carriage 7 supported by guide member 6. Carriage 7, in turn, is provided with a vertically extending guide member 8.

While carriage 7 including guide member 8 is horizontally movable along guide member 6, guide member 8, in turn, carries a vertically movable carriage 7 which has a support for a support member 10. Carriages 7 and 9 of apparatus 5 form a type of two-way support which makes possible movements of the support member 10 in two perpendicularly directed directions, namely, on the one hand, along a vertical Y-axis and, on the other hand, along a horizontal Z-axis, wherein the latter extends parallel to the longitudinal axis 11—11 of closing unit 3 or its direction of actuation.

Support member 10 of apparatus 5 has at its lower end a grasping member 12 which can be pivoted about at least two axes which extend perpendicularly relative to each other, namely, a longitudinal axis and a transverse axis of support member 10.

Linear drives are provided for moving carriage 7 along horizontal guide member 6 and for moving carriage 9 along guide member 8 on carriage 7.

In order to achieve high travel speeds of carriages 7 and 9 of the two-way support of apparatus 5, the aforementioned drives are pneumatic linear drives of which, for clarity's sake, FIG. 2 only shows linear drive 13 for carriage 9 which is vertically adjustable on guide member 8 and supports support member 10 for grasping member 12.

As illustrated in FIG. 2, linear drive 13 is a double-acting pneumatic drive which includes a piston 15 without piston rods movable in a cylinder 14 (Orega-Cylinder), whereih the piston 15 forms two separate working chambers 14a and 14b in cylinder 14. Working chamber 14a is supplied with compressed air through a line 16a, while working chamber 14b is in communication with a compressed air line 16b. An electromagnetic valve 17 is used to alternately supply air to and discharge air from the working chambers 14a and 14b of cylinder 14. Valve 17 is movable, for example, from a middle locking position for both lines 16a and 16b into a right or left opening position.

When valve 17 is in the left opening position, compressed air is admitted through line 16a to working chamber 14a of cylinder 14, while air is being discharged at the same time from working chamber 14b. Conversely, when valve 17 is in the right switching position, compressed air is admitted through line 16b into working chamber 14b, while air is being discharged from working chamber 14a through line 16a.

Valve 17 is actuated by means of electromagnets which are controlled by a switching contact 18. The switching position of switching contact 18 is determined, for example, by the control program of the injection molding machine. The left switching position of valve 17 controls electromagnet 17a and the right switching position of valve 17 controls electromagnet 17b. The middle position of the valve 17 which corresponds to a locking position for both working chambers 14a and 14b of pneumatic cylinder 14 is adjusted mechanically by means of spring action.

A braking device 19 is provided between the vertically movable carriage 9 for support member 10 and its guide member 8. The braking device 19 can be switched on and off and is in contact with the switching contact 18 for the control of valve 17 of linear drive 13. The control is effected in such a way that the braking device 19 is switched on or rendered operative when the compressed air supply to the two working chambers 14a and 14b of pneumatic cylinder 14 is disconnected, while the braking device 19 is switched off or rendered inoperative when compressed air is supplied to one of the two working chambers 14a and 14b of pneumatic cylinder 14. A control line 21 is connected to two control lines 20a and 20b for valve 17 which are controlled by switching contact 18. Control line 21 is connected to a switching magnet which acts as actuating member 22. When voltage is applied through control lines 21 to the electric switching magnets, the magnet is actuated against the restoring force of a spring 23 and, as a result, switches off or renders inoperative the braking device 19. When the voltage is diconnected from control line 21, the electric magnet falls off, the restoring spring 23 becomes effective and switches on or renders operative the braking device 19.

Thus, braking device 19 acts as a compression spring-operated brake which is switched off by means of the electric switching magnet against the force of this drawing spring 23, and is mechanically engaged by means of the restoring spring 23 when the switching magnet is inoperative.

In the embodiment illustrated in the drawing, the braking device includes a pinion 25 rotatably mounted about an axis 24 on the carriage 9. Pinion 25 meshes with a rack 26 which is rigidly mounted on guide member 8 for carriage 9.

When carriage 9 is moved in the longitudinal direction of guide member 8, pinion 25 rolls on rack 26 in such a way that each position of the carriage 9 on guide member corresponds to a certain position of rotation of pinion 25. As soon as the switching magnet of the actuating member 22 is without current by separating the voltage from control line 21, the restoring spring 23 pushes a slide 27 into a position of engagement relative to pinion 25, so that pinion 25 is locked with respect to rotation and, thus, through rack 26 an exact positioning of carriage 9 on guide member 8 is effected.

This embodiment of the braking device 19 has the additional advantage that, in the case of a voltage loss, carriage 9 is locked on guide member 8 in its respective position, so that it cannot perform undesired movements.

The braking device 19 does not necessarily have to be formed by a pinion 25 meshing into a rack 26. It is possible, for example, to provide spring-biased braking plates on carriage 9 and/or on actuating member 15 of linear drive 13. In this case, a stationary braking rail would be assigned to guide member 8. Such a frictionally acting braking device is particularly suitable due to its simplicity for mounting between carriage 7 and guide member 6 of apparatus 5, if the elastic oscillation of the pneumatic linear drive is to be prevented also in the horizontal direction.

While specific embodiments of the invention have been shown and described in detail to illustrate the application of the inventive principles, it will be understood that the invention may be embodied otherwise without departing from such principles.

We claim:

1. In an apparatus for removing injection molded articles from an open injection mold of an injection molding machine, including a first guide member extending in alignment with the closing direction of the injection mold, a first carriage movable on the first guide member, a second vertically extending guard member mounted on the first carriage, a second carriage vertically movable on the second guide member, a support member attached to the second carriage, a grasping means mounted on the bottom end of the support member, the grasping means being pivotable about two axes extending perpendicularly relative to each other, the first carriage moved on the first guide member and the second carriage moved on the second guide member by means of pneumatic linear drives, the improvement which comprises a braking means mounted between the second carriage and the second guide member, the braking means serving to lock the movement of the second carriage relative to the second guide member, wherein the pneumatic linear drive for the second carriage includes a cylinder having an axis, a piston axially movable in the cylinder, the cylinder defining separate first and second working chambers, the piston separating the first and second working chambers from each other, an electromagnetic valve controlled to the first and second working chambers by means of compressed air lines, the electromagnetic valve controlled by two electromagnets, so that compressed air is supplied to or discharged from the working chambers via the compresses air lines, depending upon the position of the electromagnetic valve effected by the electromagnets, and wherein the electromagnetic valve of the drive for the second carriage and the braking means are controlled in such a way that the braking means is disengaged when the drive of the second carriage is actuated, and the braking means is engaged when the drive for the second carriage is not actuated.

2. The apparatus according to claim 1, wherein the braking means comprises a pinion mounted on the second carriage and a rack mounted on the second guide member, wherein the pinion meshes with the rack, and a slide member which can be brought into and out of engagement with the pinion against the force of a compression spring.

3. The apparatus according to claim 2, wherein the slide member is movable by a magnetic force.

4. The apparatus according to claim 2, wherein the slide member is movable by a pneumatic force.

5. The apparatus according to claim 1, wherein the braking means comprises spring-biased braking plates mounted on the second carriage, and a brake rail mounted on the second guide member frictionally engaged by the braking plates.

6. The apparatus according to claim 5, wherein the braking plates are movable against the bias of the spring by a magnetic force.

7. The apparatus according to claim 5, wherein the braking plates are movable against the bias of the spring by a pneumatic force.

* * * * *

UNITED STATES PATENT AND TRADEMARK OFFICE
CERTIFICATE OF CORRECTION

PATENT NO. : 4,717,310

DATED : January 5, 1988

INVENTOR(S) : Friedrich Heindl et al

It is certified that error appears in the above-identified patent and that said Letters Patent is hereby corrected as shown below:

In the heading of the Patent, it should read:

--[75] Inventors: Friedrich Heindl

Signed and Sealed this

Twenty-first Day of June, 1988

Attest:

DONALD J. QUIGG

*Attesting Officer*  *Commissioner of Patents and Trademarks*